United States Patent Office.

PHILIP L. SYLVESTER, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 229,493, dated June 29, 1880.

Application filed May 8, 1880. (Specimens.)

*To all whom it may concern:*

Be it known that I, PHILIP L. SYLVESTER, of Auburn, in the county of Cayuga, and in the State of New York, have invented certain new and useful Improvements in the Manufacture of Buttons from Plastic Material, (Case E;) and I do hereby declare that the following is a full, clear, and exact description thereof.

The design of my invention is to produce upon the surface of a button the appearance of a woven fabric; and to this end it consists in the method employed, substantially as and for the purpose hereinafter specified.

In the manufacture of buttons I take a sheet of the prepared material, and, after the same has become slightly softened, cover its surface with a piece of woven fabric having open meshes, and press the same lightly into said plastic surface. I next sprinkle powdered coloring matter upon the surface of the sheet of plastic material, and then remove the fabric, when it will be found that all of the surface between the threads is coated with the coloring-powder, while such portions as were covered by said threads preserve the original color. The sheet of material being passed through dies, it will be found that each button produced has upon its surface the counterpart of the fabric, the threads being represented by the original color of the body of said button, while the spaces between said threads are represented by the color used.

Having thus fully set forth the nature and merits of my invention, what I claim as new is—

The hereinbefore-described method of ornamenting buttons by placing woven fabric upon sheets of plastic material, dusting over the same coloring material, and then removing said fabric and passing said sheets through dies, substantially as specified.

In testimony that I claim the foregoing I have hereunto set my hand this 5th day of May, 1880.

P. L. SYLVESTER.

Witnesses:
P. C. WOODRUFF,
H. WOODRUFF.